United States Patent [19]

Richter et al.

[11] Patent Number: 4,793,161
[45] Date of Patent: Dec. 27, 1988

[54] EFFECTIVE DIFFUSER/THICKENER SCREEN BACKFLUSHING

[75] Inventors: Johan C. F. C. Richter, Olso, Norway; Ole J. Ricter; Finn Jacobsen, both of Karlstad, Sweden

[73] Assignee: Kamyr AB, Karlstad, Sweden

[21] Appl. No.: 125,710

[22] Filed: Nov. 27, 1987

[51] Int. Cl.[4] .............................................. D21D 5/04
[52] U.S. Cl. .................... 68/181 R; 68/184; 68/190; 162/60; 162/251; 210/411; 8/156
[58] Field of Search ............. 68/181 R, 184, 190, 68/18 F; 162/60, 251, 252; 210/333.01, 393, 411, 159, 203; 8/156; 92/117, 117 A

[56] References Cited

U.S. PATENT DOCUMENTS

| | | | |
|---|---|---|---|
| 1,601,091 | 9/1926 | Wayland | 68/190 |
| 1,605,412 | 11/1926 | Williams | 68/190 |
| 1,857,026 | 5/1932 | Ligon | 92/117 R X |
| 3,445,002 | 5/1969 | Muller | 210/333.1 X |
| 3,579,420 | 5/1971 | Richter | 162/237 |
| 3,704,603 | 12/1972 | Richter | 68/18 F |
| 3,729,961 | 5/1973 | Leffler | 68/181 R |
| 3,760,948 | 9/1973 | Johansen | 210/342 |
| 4,172,037 | 10/1979 | Golston | 210/315 |
| 4,468,319 | 8/1984 | Laakso | 210/333.01 X |
| 4,529,482 | 7/1985 | Richter et al. | 68/181 R X |
| 4,556,494 | 12/1985 | Richter et al. | 210/785 |

FOREIGN PATENT DOCUMENTS 494680 5/1954 Italy ........................ 68/190

OTHER PUBLICATIONS

Kamyr Bulletin No. 400 DR "Kamyr Diffusion Washers", List of Installations and Applications as of Dec. 31, 1974.
Kamyr Bulletin No. 600, "For New Bleach Plants, Bleach Plant Stage Additions, New Brown Stock Washing Systems, Brown Stock Washing Improvements".

Primary Examiner—Timothy F. Simone
Assistant Examiner—Stephen F. Gerrity
Attorney, Agent, or Firm—Nixon & Vanderhye

[57] ABSTRACT

The screens of a pulp treating vessel, such as a paper pulp thickener, or diffuser, are back flushed in a simple yet effective manner. The screens are mounted to a supporting conduit within a vertical vessel, and a cylinder is connected at one open end to the conduit, and the other open end is disposed within the pulp inside the vessel. A piston is mounted within the cylinder and relative movement between the piston and cylinder is effected periodically in order to force liquid from within the cylinder into the conduit and out the screens, backflushing the screens and preventing clogging. Since no additional volume of liquid is added to the vessel during backflushing, no surge occurs in the vessel. Conventional accumulators, on/off valves, and the like can be eliminated while—in the case of diffusion washing—efficiency can be increased as much as 20-30%, and capacity increased as much as about 15%.

12 Claims, 2 Drawing Sheets

EFFECTIVE DIFFUSER/THICKENER SCREEN BACKFLUSHING

BACKGROUND AND SUMMARY OF THE INVENTION

There are a number of paper pulp treating operations in which screens mounted on a reciprocal supporting conduit are disposed in a vessel. Thickening, displacement bleaching, and diffusion washing are three typical types of operations which are accomplished utilizing apparatus as typified by U.S. Pat. Nos. 3,704,603, 3,760,948, and 4,172,037 (the disclosures of which are incorporated by reference herein). While such techniques are imminently effective for treating pulp, they are not without their drawbacks.

One drawback that limits the versatility of such techniques is the fact that in many installations, in order to prevent the screens from clogging a volume of backflushing liquid is periodically introduced into the vessels. This causes a surge in the vessel volume which is unacceptable in multi-stage treatment techniques. Further, the equipment necessary to effectively perform the backflushing is expensive and complicated. Typically, an accumulator (which would be of titanium and thus very expensive, in the case of displacement bleaching), small pump for filling the accumulator, two on-off valves, and a controller for the valves, are necessarily provided in prior art systems. Even so, the backflushing liquid is supplied to the vessel at less than optimum conditions since the accumulator typically supplies the backflushing liquid at a velocity that decreases from the start of application to the completion. Further, the constant opening and closing of the extraction and backflushing valve, and the resulting disruption on the treatment process, restricts the efficiency and capacity of the treatment.

According to the present invention, the above-mentioned drawbacks are overcome in a simple yet effective manner. According to the present invention, the backflushing liquid is supplied from within the vessel itself, rather than from the exterior of the vessel. The backflushing liquid is typically provided, according to the invention, from a cylinder which is mounted to the bottom of the screen supporting conduit. The cylinder has a first open end in communication with the interior of the screen support conduit, and a second open end in open communication with the pulp being treated within the vessel. A piston is mounted within the cylinder, and relative movement between the piston and cylinder is effected. Utilizing this apparatus, it is possible to entirely eliminate the accumulator and its associated pump, and to replace the two on/off valves and their associated controller with a simple control valve. Thus extraction can be continuous rather than intermittent, and the extraction volume is proportioned with respect to the effective volume of the cylinder so that efficient backflushing occurs.

Utilizing the invention not only is it possible to eliminate the accumulator, piping, and its other associated components as described above, but it is also possible to more efficiently treat a larger capacity of pulp. For example, according to the invention it is possible to increase capacity of pulp being treated by as much as about 15% in the case of diffusion washing, while increasing the efficiency of the diffusion washing by as much as 20 to 30%. Since the entire volume of backflushing liquid is provided from within the vessel itself, surge is eliminated thereby expanding the number of treatment techniques that can be practiced utilizing the invention.

Also according to the invention, a method of effecting treatment of pulp with screens while minimizing screen clogging is provided, utilizing a generally upright vessel having a pulp inlet and a pulp outlet, the screens mounted to a supporting conduit within the vessel, and the screens having screening surfaces extending generally vertically. The method comprises the steps of (a) Passing pulp generally vertically in the vessel from the inlet to the outlet. (b) Effecting substantially continuous extraction of liquid from the screens through the screen support conduit at a predetermined flow rate. (c) Effecting generally vertical movement of the screens and support conduit in the direction of pulp low at a first speed, and in the direction opposite pulp flow at a second speed much higher than the first speed. (d) When moving the screens in the direction opposite pulp flow, supplying a known quantity of liquid to the conduit and screens from within the vessel to effect backflushing of the screens without a surge in the vessel volume. And, (e) controlling the continuous extraction flow rate with respect to the known quantity of backflushing liquid so that the known quantity of backflushing liquid is sufficient to effectively backflush the screens to prevent clogging thereof. The method according to the invention is particularly adapted to (although not restricted to) diffusion washing, thickening, and displacement bleaching.

A significant object according to the present invention is to effectively back flush screens in a pulp treatment vessel in a simple manner. This and other objects of the invention will become clear from an inspection of the detailed description of the invention, and from the appended claims.

DETAILED DESCRIPTION OF THE DRAWINGS

Figure 1:
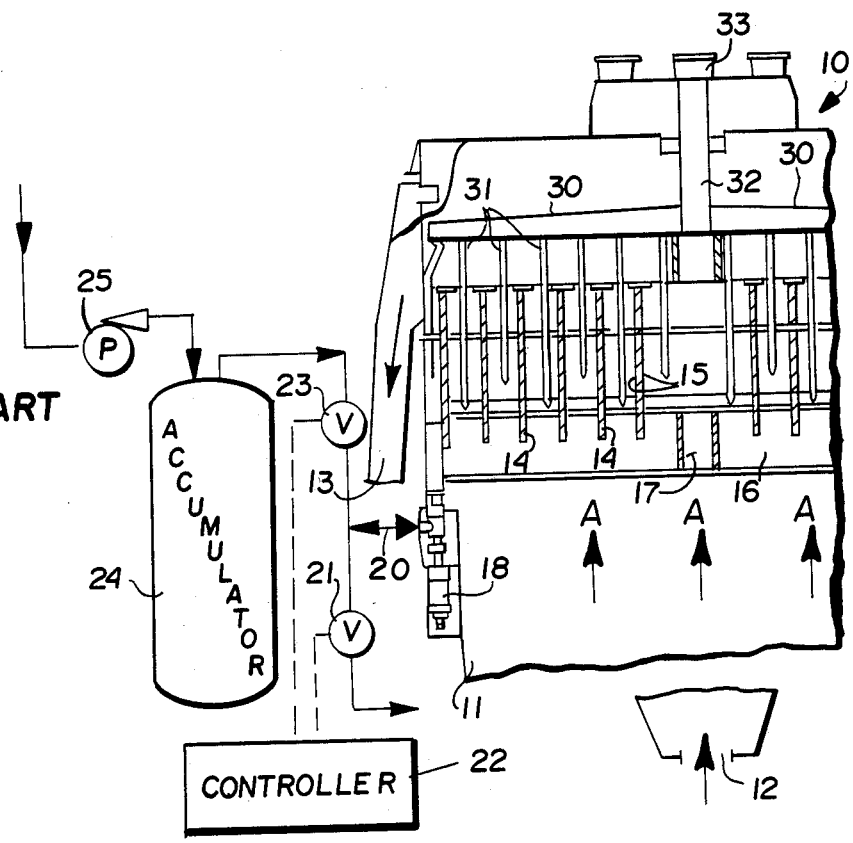
FIG. 1 is a side view, partly in cross-section and partly in elevation, of an exemplary prior art diffusion washer with backflushing.

FIG. 1 illustrates a conventional diffusion washer which is used for washing paper pulp, and effects backflushing of the screens to keep them unclogged. This conventional apparatus, indicated generally by reference numeral 10, includes a generally upright vessel 11 having a pulp inlet 12 and a pulp outlet 13 which are vertically spaced from each other. The pulp is introduced into the pulp inlet 12, which typically is at the bottom, and flows vertically within the vessel 11, being discharged through the conduit 13 adjacent the top.

The basic operative components of the device 10 comprise a plurality of concentric cylindrical screens 14, having screen faces 15 which are generally vertical and are in contact with the pulp. The concentric screens 14 are supported on support conduits 16, which typically are in the shape of arms extending radially outwardly from a central hub section 17. The conduits 16 are hollow, and the interior may be divided into chambers if desirable.

The screen arms 16 are mounted for reciprocation in the vertical directions by a reciprocating power structure or structures, preferably three or more hydraulic cylinders 18 which are equally spaced around the periphery of the device 10. The cylinders 18 reciprocate the screens 14 and support arms 16 so that they move very slowly n the direction of pulp movement (arrows A in FIG. 1) until the end of the vertical stroke is reached, and then reverse and move opposite to the direction A. While the relative speeds in direction A and opposite to direction A can be varied, in many installations the movement in direction A is much slower than the movement in the direction opposite to A (i.e. downwardly in the exemplary embodiment illustrated). This serves to assist in keeping the screens 14 relatively clog-free.

To further alleviate the possibility of screen clogging, many commercial installations also utilize accessory backflushing liquid. Normally, at least through most of the length of the stroke in A, liquid which has been screened from the pulp and passed through screens 14 into arms 16, is extracted through conduit 20 (about 1 min), and on/off valve 21, and carried to a remote site. When screen cleaning is desired controller 22 closes the on/off valve 11, and opens the on/off valve 23. The valve 23 is connected to an accumulator 24, which is recharged by a pump 25. When the valve 23 is opened and the accumulator 24 is discharged (5–12 sec), liquid flows into the vessel 10 through the conduit 16 and moves from the interior of the screens 14 through the perforated faces 15 thereof, cleaning the perforations in the faces 15.

What has just been described above is utilizable for thickening operations. Where the pulp is to be treated with a liquid, too, such as a wash liquid or a bleaching liquid, then the rotating arms 30 with depending vertical spray nozzles 31 are utilized, the arms 30 being provided with treatment liquid through the hollow shaft 32. Shaft 32 is rotated while supplying wash or bleaching liquid, or the like, by a motor 33.

There are a number of undesirable features associated with the structures illustrated in FIG. 1. A significant difficulty is that when back flush liquid is being supplied to the vessel 11 from the accumulator 24, a "surge" takes place in the vessel 11 since the interior volume of fluent material increases. Another difficulty is associated with the constant switching on and switching off of the on/off valves 21, 23, with resultant time delays, the pulp treatment is not as efficient as desirable, and which capacity is limited. Also, most accumulators typically discharge the liquid initially at a high pressure, and then at a lesser pressure as the gas driving the liquid out of the accumulator increases its volume. Also, the on/off valves 21, 23, pump 25, and accumulator 24 (which must be made of expensive material such as titanium for some uses, such as displacement bleaching) are very expensive.

Figure 4:
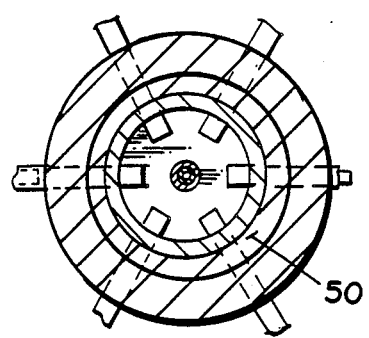
FIG. 4 is a cross-sectional detail view taken along lines 4—4 of FIG. 3.
Figure 5:
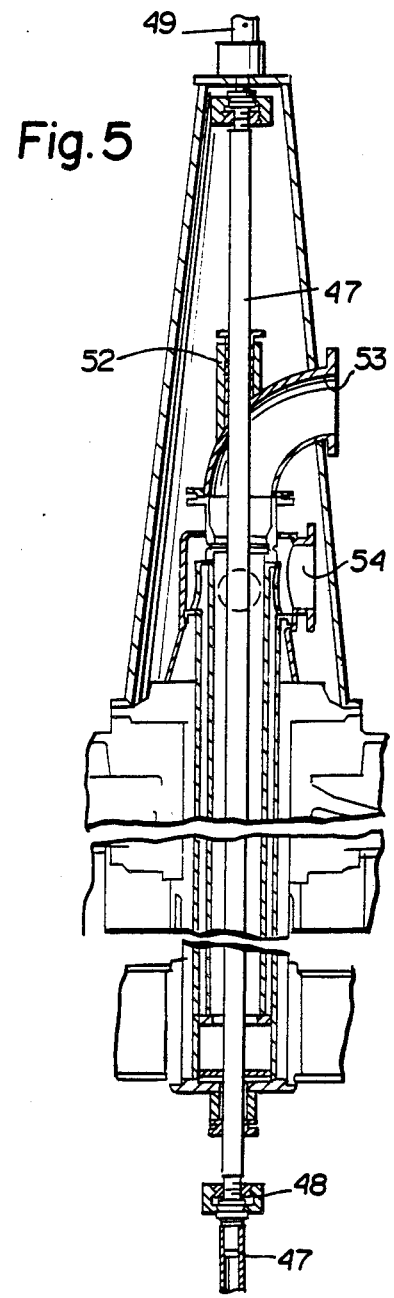
FIG. 5 is an enlarged side view, partly in cross-section and partly in elevation, taken along lines 5—5 of FIG. 2.
Figure 6:
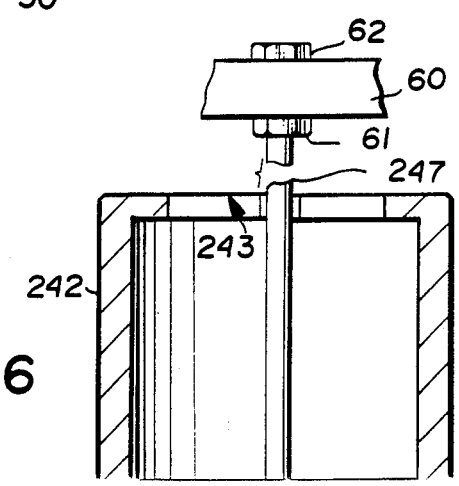
FIG. 6 is a view like that of FIG. 3 only showing the zero position of the piston when a stationary piston is utilized.

One exemplary embodiment of the invention is illustrated in FIGS. 2 through 5, with portions of a second embodiment illustrated in FIG. 6. According to the invention all of the above-mentioned problems associated with the prior art have been eliminated in simple and effective manner. Utilizing the structures such a illustrated in FIGS. 2 through 5 for diffusion washing, for example, it is possible to increase capacity by as much as about 15%, and to increase washing efficiency by as much as about 20 to 30%, compared to the conventional diffusion washers illustrated in FIG. 1.

Component parts of the structure illustrated in FIGS. 2 through 5 that are comparable to those in FIG. 1 are illustrated by the same reference numeral only preceded by a "1".

The device 110 is very similar to the device 10, the major difference being the apparatus and manner for backflushing. Rather than periodically terminating extraction through conduit 120, in the device 110 extraction is essentially continuous. The control valve (as opposed to an off/off valve) 40 is controlled to regulate the rate at which liquid is being extracted from the pulp, which will depend upon whether or not the pulp is being thickened or diluted or retaining the same consistency, the treatment liquid, etc. For the device 110, the source of backflushing liquid is located interiorly of the vessel 111 rather than exteriorly thereof. What this means is that when backflushing occurs there is no surge within the vessel 111 since the volume of fluent material within the vessel 111 remains essentially the same.

The backflushing apparatus, in the preferred embodiment illustrated in FIGS. 2 through 5, comprises a simple cylinder 42 which is open at both ends thereof. The first end 43 is open into the interior of the conduit 116, and the second end 44 is open to the volume of pulp within the vessel 111. Mounted within the cylinder 42 for relative reciprocation with respect to the cylinder 42 is a piston 46, which is connected to a piston rod 47. In the FIGS. 2 through 5 embodiment, that piston rod 47, which may be composed of several sections as illustrated by the connector 48 (see FIGS. 2 and 5), is ultimately connected to a small hydraulic cylinder 49 mounted atop the entire device 110. The cylinder 49 effects movement of the piston 46 with respect to the cylinder 42.

The cylinder 42 and piston 46 need not be made of any special materials, and no particular care is necessary to see that there is a tight seal therebetween. Small amounts of leakage between the piston 46 and cylinder 42 are inconsequential. It is only important to make sure that the piston 46 an cylinder 42 are of compatible material so that they do not harm each other.

Figure 2:
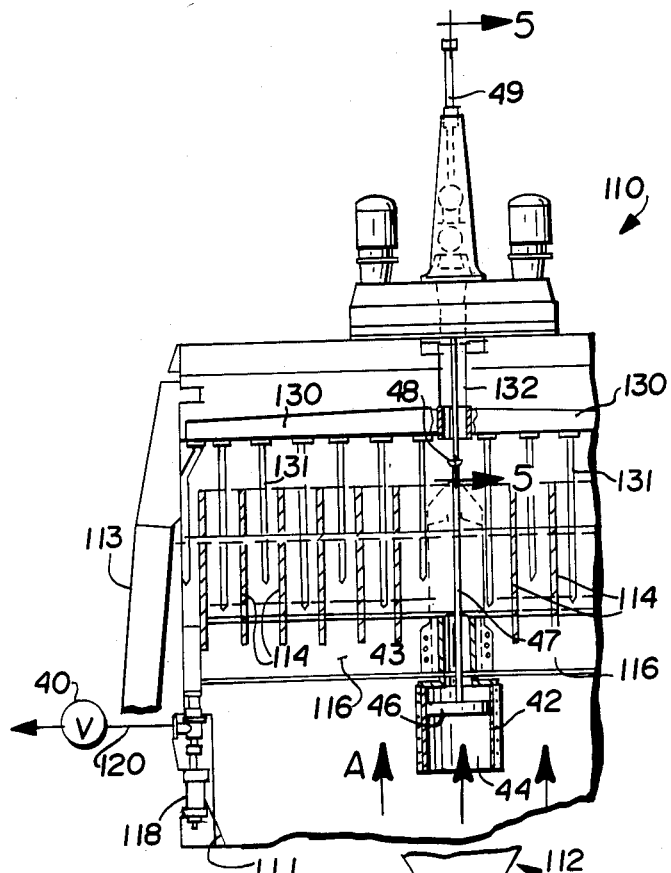
FIG. 2 is a side view, partly in cross-section and partly in elevation, of an exemplary diffusion washer according to the present invention.
Figure 3:
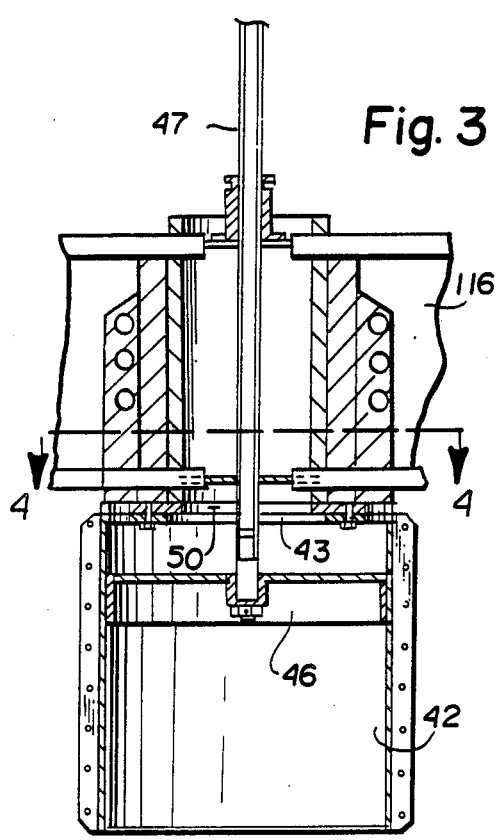
FIG. 3 is a detail side cross-sectional view of the backflushing assembly of FIG. 2.

FIGS. 3 and 4 illustrate in somewhat more detail than FIG. 2 one way in which the cylinder 42 can be attached to the hub section of the conduits 116. These exact details of attachment are not particularly significant as far as the invention is concerned, however, it being necessary only to make sure that the connection is secure and that there is a free flow of extraction/backflushing liquid through the hole 50 in the bottom of the hub section of conduits 116, and the open first end 43 of the cylinder 42. Similarly, FIG. 5 illustrates the details of the top portion of the device 110 and shows how the piston rod 47 passes through stuffing box 52, and through the conventional pipes 53, 54 which supply the treatment fluid to the arms 130. Again, the details of the connections are not particularly significant, only the fact that care be taken to minimize interruption of the flow of treatment liquid to the spray tubes 131 while still properly connecting the piston rod 47 to the cylinder 49. The cylinder 49 can be controlled from the same source of hydraulic fluid as the cylinders 118.

FIG. 6 illustrates an embodiment in which the piston remains stationary. In this embodiment structures generally comparable to those in the FIGS. 2 through 5 embodiment are illustrated by the same reference numeral only preceded by a "2".

As can be seen in FIG. 6, the piston 246 is mounted stationary with respect to the vessel 111 since the rod 247 is connected to a support structure 60 at the top of the device 110 in a relatively rigid manner. For example, only, in FIG. 6 cooperating nuts 61, 62 are shown which engage a threaded end of the piston rod 247 and therefore hold it in place. In this embodiment, the relative movement between the piston 246 and the cylinder 242 takes place solely as a result of action by the cylinders 118, and the "zero" position of the components is as illustrated in FIG. 6, with the piston 246 adjacent the bottom, or second open end 244, of the cylinder 242.

Operation

With particular reference to FIGS. 3 through 4, an exemplary method of effecting backflushing during the treatment of the pulp will now be described.

The pulp flows into inlet 112 and upwardly in direction A in vessel 111, ultimately being discharged through discharge 113. Treatment liquid, such as wash liquid or bleach liquid, is continuously added to the pulp via the rotating arms 130 and the vertical spray tubes 131 depending therefrom. Liquid is withdrawn from the pulp through the screens 114, into the support conduits 116, passing out the conduit 120 through the control valve 40. The cylinders 11 move the support conduits 116 and the screens 114 slowly upwardly in the direction of pulp movement until the end of the stroke is reached, and then move them quickly downwardly at the end of the upward stroke, to the bottommost position.

Just prior to the initiation of the downward stroke of the cylinders 118, the cylinder 149 is actuated to quickly move the piston 46 upwardly with respect to the cylinder 42. Although the exact speed of movement is not particularly critical, typically the system would be designed so that it took about two seconds for the piston 46 to move from its lowermost position (in which the volume within the cylinder 42 was filled with a maximum amount of backflushing/extraction liquid from the conduits 116 and with a minimum amount of pulp), to a more upward position (in which the cylinder 42 was filled with a minimum amount of back flush/extraction liquid and a maximum amount of pulp).

The system is preferably designed so that the effective volume of the cylinder 42 (that is the amount of back flush/extraction liquid that it will contain at the start of the backflushing operation) is enough to effect efficient backflushing. Extraction continues during backflushing. In one typical utilization, for example, if the extraction flow rate through the conduit 120 controlled by the valve 40 is 6,000 liters per minute, the effective volume of the cylinder 42 will be between about 10,000–12,000 liters, or roughly twice the amount of liquid extracted in a minute.

Of course as the piston 46 moves upwardly in the cylinder 42, the volume in the cylinder 42 behind the piston 46 is filled with pulp. Liquid which has been expelled from the cylinder 42 through open end 43 and hole 50, flows into conduit 116, through screens 114, and moves through the screen perforations, unclogging them.

After the backflushing operation, the cylinder 49 slowly moves the piston 46 downwardly. As it does this, liquid from conduits 116 passes into the cylinder 42 above the piston rod 46. This generally displaces the pulp from behind the piston 46, as the piston 46 moves slowly downwardly in the cylinder 42, and the cylinder 42 fills with liquid from conduits 116.

While the FIG. 6 embodiment is also effective in backflushing the screens, it may be considered to be slightly less effective than the embodiment of FIGS. 2 through 5 since the backflushing action will not start until there has been downward movement of the entire conduit/screen assembly 116, 114. Of course it is important that the length of the cylinder 42, 242 be designed considering the stroke of the cylinders 118, and whether or not there will be an additional, separate stroke of the piston rod (the FIGS. 2 through 5 embodiment).

While the invention has been specifically described above with respect to thickeners, diffusion washers, and displacement bleachers, it is to be understood that the invention also has other applications. Wherever no surge yet effective liquid movement within a pulp vessel is desired, the invention may be employed.

Further, it will be seen that the "backflushing" components according to the invention can be considered to be a liquid pumping means in general, located within the vessel and including a chamber defining element (cylinder) and liquid engaging element (piston). While a piston and cylinder are the simplest and therefore the preferred form of such components, other equivalent fluid components, such as a rolling diaphragm in a cylinder, etc., can be utilized where specific requirements call for it. Thus the invention is to be accorded the broadest interpretation of the appended claims so as to encompass all equivalent structures and methods.

What is claimed is:

1. A pulp treating apparatus comprising:

a generally upright vessel defining an interior volume containing pulp to be treated;

a pulp inlet to the vessel;

a pulp outlet from the vessel, the pulp flowing generally vertically between the inlet and the outlet;

a plurality of screens mounted within the vessel and connected to supporting liquid conduits;

extraction means for withdrawing liquid from the pulp, through the screens, and through the conduits to a point outside the vessel; and screen backflushing means mounted within the vessel and including a chamber defining element having first and second ends, the first end in open communication with liquid in the liquid conduits, and the second end in open communication with the pulp within the interior volume of the vessel; a liquid engaging element mounted within said chamber defining element for relative reciprocal movement between said liquid engaging element and said chamber defining element; and means for effecting relative movement between said chamber defining element and said liquid engaging element to cause said liquid engaging, element to force liquid out of the chamber in one direction of relative movement between said elements, to effect backflushing, and take liquid into the chamber in another direction of relative movement therebetween.

2. Apparatus as recited in claim 1 wherein said chamber defining element comprises an open-ended cylinder, and wherein said liquid engaging element comprises a piston, and wherein said means for effecting relative movement between said chamber defining element and said liquid engaging element includes a piston rod.

3. Apparatus as recited in claim 2 further comprising means for effecting vertical movement of said screens and supporting conduits in the direction of pulp movement at a first speed, and in the direction opposite to pulp movement at a second speed much faster than said first speed.

4. Apparatus as recited in claim 3 wherein said means for effecting relative movement between said piston and cylinder consists essentially of said means for effecting vertical movement of said screens and supporting conduits, said piston rod, and means for maintaining said piston rod stationary with respect to said vessel.

5. Apparatus as recited in claim 3 wherein said means for effecting relative movement between said piston and said cylinder and said means for effecting vertical movement of said screens and support conduits are distinct structures.

6. Apparatus as recited in claim 5 wherein said means for effecting relative movement between said piston and cylinder includes a linear actuator mounted atop said vessel, and connected to said piston rod.

7. Apparatus as recited in claim 3 comprising a diffusion washer, and including moving spray tubes for introducing wash liquid between said screens.

8. Apparatus as recited in claim 3 comprising a displacement bleacher, and including spray tubes for introducing bleaching fluid between said screens.

9. Apparatus as recited in claim 1 further comprising means for effecting vertical movement of said screens and supporting conduits in the direction of pulp movement at a first speed, and in the direction opposite to pulp movement at a second speed much faster than said first speed.

10. Pulp treating apparatus comprising:
a generally upright vessel defining an interior volume containing pulp;
liquid conduit means mounted in said vessel; and
liquid pumping means located within said vessel and comprising a chamber defining element having first and second ends, said first en in open communication with pulp in the interior volume of the vessel, and said second end in open communication with liquid in said liquid conduit; a liquid engaging element mounted within said chamber defining element for relative reciprocal movement between said liquid engaging element and said chamber defining element; and means for effecting relative movement between said chamber defining element and said liquid engaging element to cause said liquid engaging element to force liquid out of the chamber and into the liquid conduit means in one direction of relative movement between said elements, and to take the liquid into the chamber from the liquid conduit means in another direction of relative movement therebetween.

11. Apparatus as recited in claim 10 wherein said chamber defining element comprises an open ended cylinder, and said liquid engaging element comprises a piston, and said means for effecting relative movement includes a piston rod.

12. Apparatus as recited in claim 11 further comprising screen means disposed in said vessel, the interior of said screen means operatively connected to said liquid conduit means.

* * * * *